United States Patent [19]

Smith

[11] Patent Number: 4,898,397
[45] Date of Patent: Feb. 6, 1990

[54] SEGMENTED DISK CLAMP

[76] Inventor: Robert S. Smith, 1263 Emory St., San José, Calif. 95126

[21] Appl. No.: 174,593

[22] Filed: Mar. 29, 1988

[51] Int. Cl.⁴ .............................................. B23B 31/30
[52] U.S. Cl. ...................... 279/4; 269/48.1;
 279/1 L; 279/2 A; 60/583; 346/137; 360/99.12;
 369/271
[58] Field of Search .................. 279/1 L, 2 R, 2 A, 4;
 346/137; 360/86, 98.08, 99.05, 99.12; 369/261,
 270, 271; 60/533, 583, 593; 269/48.1, 48.2, 48.3,
 48.4

[56] References Cited

U.S. PATENT DOCUMENTS

| 1,436,430 | 11/1922 | Brown | 346/137 |
| 2,937,916 | 5/1960 | Hohnecker | 360/86 X |
| 3,670,315 | 6/1972 | Fowler | 346/137 X |
| 4,022,478 | 5/1977 | Stewart | 360/86 X |

*Primary Examiner*—Steven C. Bishop
*Attorney, Agent, or Firm*—Robert Samuel Smith

[57] ABSTRACT

A clamp for attaching a plate such as a memory disk onto a spindle comprising a segmented clamp that may be withdrawn within the projected boundary of the interior hole in the disk for convenient unloading and a two part piston clamping means that applies a moderate clamping force followed by a larger clamping force.

5 Claims, 1 Drawing Sheet

SEGMENTED DISK CLAMP

BACKGROUND

1. Field of Invention

This invention relates to clamps such as a device for clamping a memory disk to a spindle for the purpose of testing the finished disk, burnishing or polishing, etc.

2. Prior Art

Each of the many kinds of clamps usually has a number of uses and the particular type of clamp embodied in this invention may be introduced by describing the use of clamps to attach a memory disk to a plate or "chuck" such as required at several stages of the manufacturing process. These stages include test procedures, such as measuring flatness or detecting recording errors, and manufacturing procedures such as burnishing or polishing. For these purposes, the disk is clamped on both sides wherein the clamping surface is an annular flat area concentric to the disk and extending from the inside diameter.

Published standards for the industry (ANSI specifications) state that the clamping force be uniformly distributed over the clamping area wherein both the area and the force are prescribed according to the size of the disk.

Accordingly, a clamp that has been adopted throughout the industry comprises a circular plate attached conentrically near the end of a spindle axis and having a shoulder around its perimeter. The disk is thereby positioned concentric to the spindle by the shoulder and is supported by the flat annular surface of the plate pressing on one side and a collar that is mounted concentrically and presses on the opposite side of the disk. In older versions of the prior art, the collar is screwed onto the end of the spindle protruding through the center of the disk but in more recent designs, force is applied automatically by pneumatic means after the operator positions the collar on top of the disk. The use of this clamping means is limited to manual operation in that the operator must remove the collar in order to remove the disk.

Another type of clamp is designed so that, after the disk is laid onto a supporting plate, fingers are made to extend over the clamping area in order to secure the disk. An inherent disadvantage of this design is that the fingers cannot cover the entire clamping area.

Still another type of chuck is the so called "bladder" chuck in which the disk is positioned by a collar onto a spindle supported plate and then air pressure is applied which causes a bladder to expand out over the clamping area of the disk. This design is amenable to automatic or robotic operation since there is no requirement to attach or remove a collar. However, this design does not provide the desired uniform pressure over the clamping area and the bladder clamps that are available commercialy do not provide a clamping force called for in the ANSI specification. For example for a five inch disk, the clamping force specified in the ANSI specification is 250 pounds whereas the clamping force of the typical bladder chuck is about 50 pounds.

Hydraulic rams have been disclosed in which pressure may be applied by one combination of rams operative to apply one value of pressure while a different combination of rams is operative to provide another value of pressure. However these devices require hydraulic switches or valves to switch from one combination to the other.

To summarize the present state of the prior art, there is a need for a clamp that applies a uniform large force over the entire clamping area and the design of the clamp must be such as to avoid having to remove the clamp manually or by expensive robotic means.

SUMMARY OF THE INVENTION

It is an object of this invention to provide a clamp that is suitable in applications such as the clamping attachment of a memory disk concentrically onto the end of a spindle.

It is another object of this invention to provide a clamp in which the clamping surface is an annular area adjacent to the inner diameter of the disk and in which the clamping pressure is uniform over the entire clamping area.

It is a further object of this invention to provide a clamp which does not require removal of a collar so that the chuck of this invention is amenable to its use in robotic and automatic operations.

Still another object of this invention is to provide a clamp wherein the clamping force is substantially greater than is provided by clamps of the prior art.

In one embodiment of this invention, a flat plate such as a memory disk having an inside circular mounting hole is laid onto an annular supporting surface that is adjacent and concentric to the mounting hole. The disk is clamped to the supporting surface by a segmented flat ring that presses against the side of the disk opposite to the supporting surface and concentric with the mounting hole. In order to remove the disk, one set of segments of the clamping ring moves further away from the disk surface than other segments so that all of the segments may move inward toward the center of the mounting hole without interference of any segment with its neighboring segment. Therefore, in the "unload" configuration, all of the segments are inside the projected boundary of the mounting hole of the memory disk so that the disk may be lifted vertically from the supporting surface. An essential feature of this embodiment is, therefore, to provide the advantages of complete areal coverage by a segmented clamping ring together with a means of retracting segments of the ring to within the projected boundary of the interior hole so that the disk may be removed without the necessity of manually removing a cap.

A second feature of this invention is the means to apply a clamping force to the segmented ring which, at first, is relatively moderate as a cap moves into contact with the segmented ring and then increases up to a substantially greater value. In order to provide this two stage application of pressure, the cap is attached to a clamping piston which is driven by a two part driving piston wherein one part lies within a cavity in a second part and both parts form the wall of a chamber filled with fluid thereby transmitting pressure to the clamping piston. Initially, both parts drive the clamping piston into close to clamping contact and to a position where further movement of the nested part is blocked by contact with a shoulder on an adjacent wall of the chamber. In the second step where only the nesting part of the driving piston moves, the driving piston drives the clamping piston with a force that has been increased by the ratio of the area of the nesting part divided by the sum of the area of the nesting and nested parts. A space containing a spring between the two parts allows the

DETAILED DISCUSSION OF THE DRAWINGS

Figure 1:
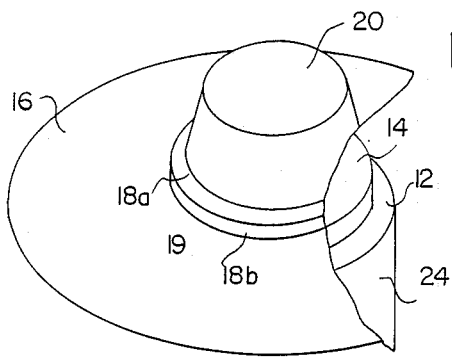
FIG. 1 is an isometric view of a disk mounted on the clamp.
Figure 2:
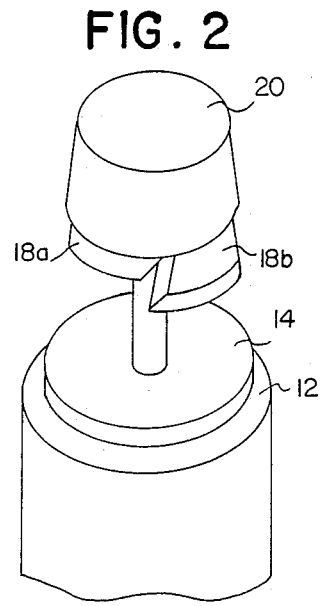
FIG. 2 is an isometric view of the clamp with the disk removed.

Turning now to a detailed discussion of the drawings, there is shown in FIG. 1, an isometric view of a preferred embodiment of the clamping device. The disk 16 is partly cut away to show the underlying support surface 12 which is a top surface of housing 24. The disk 16 is positioned by the shoulder 14 and clamped by the support surface 12 on one side. The other side is clamped by four clamping segments (two segments, 18a and b are shown in FIG. 1) that completely cover the required clamping area which is an annular border around the inside diameter of the disk 16. The boundary 19 between neighboring segments 18a and b is seen to comprise edges that are bevelled complementary to one another so that as shown in FIG. 2, segments 18a and b can be separated from one another by vertical movement of segment 18b.

In the clamping position as shown in FIG. 1, a cap 20 presses against the segments 18. In the unclamped position shown in FIG. 2, the cap 20 is lifted away from the disk and the segments 18a and b have been retracted to within the projected inside boundary of the disk 16 so that the disk can be lifted from the support surface 12.

Figure 3:
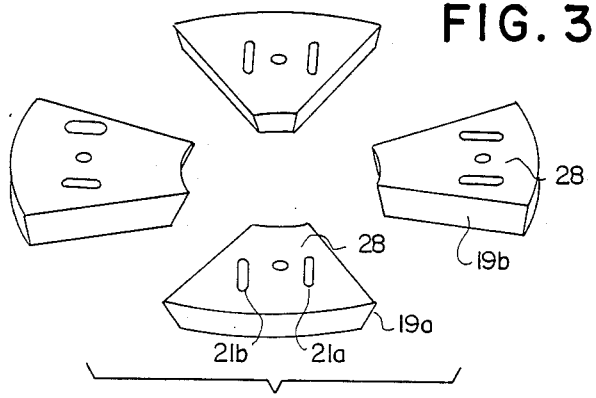
FIG. 3 is an isometric view showing details of the clamping segments.
Figure 4A:
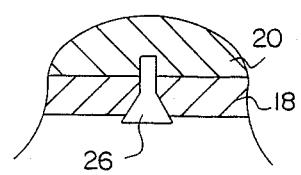
FIGS. 4a and b show cutaway sectional views of the attachment of the segment to the cap.
Figure 4B:
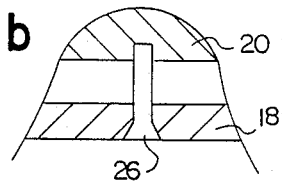
Figure 5:
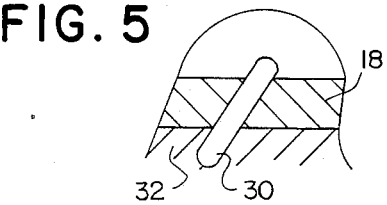
FIG. 5 is a cutaway sectional view showing a guide pin in the disk support surface that causes the segment to slide between the clamping and unloading positions.

FIGS. 3, 4 and 5 show a various detailed views of the four segments. Each segment is pie shaped having two straight edges that are bevelled. The bevel of each edge is complementary to the edge of the adjacent edge of the neighboring segment (see bevel 19a shown complementary to bevel 19b in FIGS. 1, 2 and 3 so that, as the segments are separated when unloading, the corner of a segment does not interfere with the corner of the neighboring segment). Each segment has two slots, 21a, and b, as shown in FIG. 3. As shown by the cutaway sectional view AA in FIG. 4, the slots 21a and b have chamfered sides through which a flat head pin is positioned which slideably attaches the segment to the flat clamping side of the cap 20. As shown by the cutaway sectional view along BB of FIG. 5, a slanted hole 28 in the segment is located between the slots. The location of the slotted hole 28 is illustrated in FIG. 3. Referring to FIG. 5, a slanted guide pin 30 is secured in the top surface of the housing which passes through the slanted hole in the segment. Therefore, when the cap is forced away from the disk, the segments are also lifted away and the slanted guide pin causes the segment to slide to within the projected inside boundary of the centerhole in the disk. When the cap 20 moves back toward clamping position, the guide pins force the segments to slide back toward the clamping position.

In order that the segments be withdrawn to within the projected boundary of the centerhole as the cap lifts off the disk, the angle, 32 in FIG. 5, of the slanted pin to the top surface 12 has either one of two values. Alternated segments have the same angle 32 of pin slant but neighboring segments have the other slant angle. All segments with the same slant have a given length of securing pin 26 in FIG. 4 but all segments with the larger slant are secured by short pins 26 in FIG. 4a so that when the cap separates, these segments are maintained in sliding contact with the flat cap surface as shown in FIG. 4a while the group of segments with longer securing pins 26 in FIG. 4b thereby separate from the flat cap surface as illustrated in FIG. 2. In FIG. 2, segment 18b is secured with a long pin (not shown in FIG. 2) and has a hole with a larger slant angle (32 in FIG. 5) than segment 18a.

Therefore, as illustrated in FIGS. 1 and 2, as the segment is withdrawn from the disk surface it will no longer be coplanar with its neighbor (as it is in the clamping position) so that interference between corners of segments is prevented.

Figure 6:
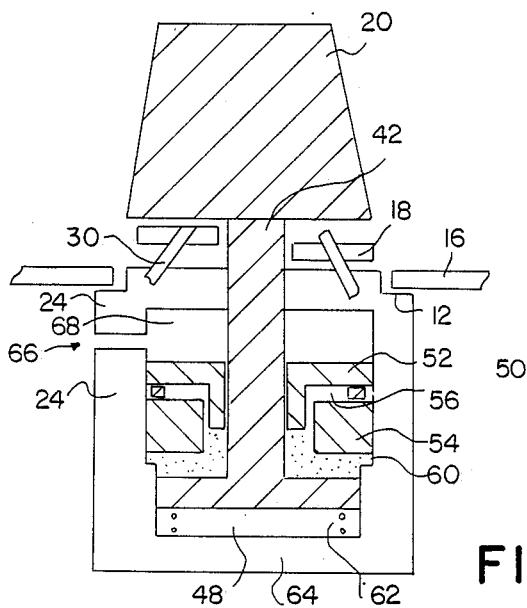
FIG. 6 is a sectional view illustrating the force intensifying means.

As shown in the sectional view of FIG. 6, the cap 20 is attached to a stem 42 which extends along the centerline of the disk 16 into the support housing 24, and is attached to a clamping piston 48 through a central opening in the driving piston 50. (Securing pins for the segments are not shown in FIG. 6.)

The driving piston, indicated generally by the number 50 comprises a nesting part 52 having a cavity containing a nested part 54. The space 56 between the two parts contains a compressible gasket or spring 58. When the nested part 54 contacts a shoulder 60 in the wall of the housing, further motion of the nested part 54 is prevented but the nesting part continues to move by virtue of the space with the collapsible spring. Therefore, the hydraulic force exerted has now been increased by the ratio of the sum of the area of the nested and nesting parts divided by the area of the nesting part.

A spring 62 between the clamping piston 48 and the end wall 64 of the housing 24 forces the cap 20 to lift the clamping segments 18 in order to retract the segments 18 and remove the disk 16 from the support surface.

In order to lower the cap and apply clamping force to the segments, air is admitted through an orifice 66 in the housing which leads into pressure chamber 68 thereby causing the driving piston 50 to move and pressurize fluid in chamber 66.

The essential features of this invention are a means to retract clamping segments within a projected boundary in order to replace a disk conveniently and a two part piston for applying pressure initially moderately and then with increased force. After studying the drawings and specification other forms of this invention may become apparent to the reader which are alternative embodiments of this invention.

1. A clamp for supporting a plate having a first side and a second side and an opening and a clamping area with a projected boundary on both sides around said opening which comprises:
   a plate support means having a first clamping surface in contact with said clamping area on said first side;
   a segmented clamp means comprising at least three platelets, each having a contact surface to provide a second clamping surface which, in a clamping position, contacts said entire clamping area on said second side and in an unloading position is withdrawn to within said projected boundary so that the plate can be removed from said plate support means;

clamp positioning means which moves said segmented clamp means between said clamping position and said unloading position.

3. A clamp as in claim 1 wherein each said platelet has a boundary surface which is parallel to the boundary surface of a neighboring platelet and wherein said boundary surface is beveled in a direction that is complementary to the direction of bevel of said neighboring boundary surface so that when said clamping means is moved from said clamping position to said unloading postion, each said beveled boundary surface may slide on the beveled boundary surface of its neighbor.

4. A clamp as in claim 3 wherein each said platelet has a surface having at least one slanted hole and at least one slotted hole and wherein said clamp means further comprises:

a cap having a flat surface;

an attachment pin means attached to said flat surface and extending through said slanted hole;

a guide pin means attached to said support surface and extending through said slanted hole;

so that each said platelet is slidably attached to said cap by said attachment pin means and when said cap is moved between said clamping position and said unloading position, said guide pin means guides said platelet between said clamping and said unloading positions.

5. A clamp as in claim 3 wherein each said platelet comprises a hole and said clamp positioning means comprises a guide pin having one end slideably positioned in said platelet hole and another end fixed in said plate support means.

2. A clamp as in claim 1 wherein said plate support means has a chamber and said clamp positioning means further comprises:

a clamping piston within said chamber;

a stem having one end connected to said cap and a second end connected to said clamping piston;

an entry means into said chamber so that pressurized fluid may be admitted into said chamber and thereby cause said clamping piston to move between said clamping position and said unloading position.

* * * * *